United States Patent
Bettez et al.

(10) Patent No.: US 9,269,236 B2
(45) Date of Patent: Feb. 23, 2016

(54) RFID TAG DISPENSER

(71) Applicants: Jean-Sébastien Bettez, Hudson (CA); Raphaël Assénat, Quebec (CA)

(72) Inventors: Jean-Sébastien Bettez, Hudson (CA); Raphaël Assénat, Quebec (CA)

(73) Assignee: 8D Technologies Inc., Montreal (CA)

( * ) Notice: Subject to any disclaimer, the term of this patent is extended or adjusted under 35 U.S.C. 154(b) by 147 days.

(21) Appl. No.: 14/060,190

(22) Filed: Oct. 22, 2013

(65) Prior Publication Data

US 2015/0112478 A1  Apr. 23, 2015

(51) Int. Cl.
*G07F 17/00* (2006.01)
*G07F 17/42* (2006.01)
*G06Q 20/34* (2012.01)
*G07F 11/04* (2006.01)

(52) U.S. Cl.
CPC .............. *G07F 17/42* (2013.01); *G06Q 20/354* (2013.01); *G07F 11/04* (2013.01); *G07F 17/0057* (2013.01)

(58) Field of Classification Search
CPC ......... G07F 17/26; G07F 11/20; G07F 11/24; G07F 11/18; G06K 13/103
USPC .......... 221/251, 233, 247, 248, 263, 269, 268
See application file for complete search history.

(56) References Cited

U.S. PATENT DOCUMENTS

| | | | |
|---|---|---|---|
| 6,247,611 B1 * | 6/2001 | Clements et al. | 221/277 |
| 6,422,417 B1 * | 7/2002 | Rawlins | 221/124 |
| 6,651,841 B2 * | 11/2003 | Tsuchida | 271/166 |
| 6,957,746 B2 * | 10/2005 | Martin et al. | 235/380 |
| 7,069,251 B1 | 6/2006 | Bartz et al. | |
| 7,387,233 B2 | 6/2008 | Masuta | |
| 7,871,009 B1 * | 1/2011 | Blonigen et al. | 235/487 |
| 8,240,508 B2 | 8/2012 | Wegelin et al. | |
| 9,002,509 B2 * | 4/2015 | Fletcher et al. | 700/231 |
| 2007/0040022 A1 * | 2/2007 | Lovegreen et al. | 235/381 |

OTHER PUBLICATIONS

PCT International Search Report and Written Opinion of the International Searching Authority from International Application No. PCT/CA2014/000750, dated Mar. 4, 2015 (8 pgs.).

* cited by examiner

*Primary Examiner* — Timothy Waggoner
(74) *Attorney, Agent, or Firm* — Wolf, Greenfield & Sacks, P.C.

(57) ABSTRACT

An RFID key dispenser. The tag dispenser has a simple mechanical construction that enables the tag dispenser to be located in unattended locations. The tag dispenser can, even with very simple construction, dispense a large number of tags between being restocked. Simple motions may be used to retrieve an individual tag for programming, move the tag to a programming station, and then route the tag to a dispensing portion of the tag dispenser or to a storage area for defective tags.

14 Claims, 20 Drawing Sheets

RFID TAG DISPENSER

BACKGROUND

Radio Frequency Identification (RFID) "tags" are used in a range of systems to identify people or things. An RFID tag contains a memory that can be programmed with data. This data can identify a thing to which the tag is attached or a person who has possession of the tag. When the tag comes near an RFID reader, that data can be read and used to control actions of the system based on the identity of the thing or person near the system. The RFID tag, for example, may identify a person using the system and charge an account of that person for use of the system.

One such system that uses RFID tags is a bicycle rental system. People enroll as members of the system. As part of enrolling, a person may provide financial account information, specifying an account that is to be charged for bicycle rentals. An operator of the system may record this financial information, in connection with an identifier for the member, which is also programmed into an RFID tag.

The RFID tag may have a form factor similar to that of a conventional credit card, making the RFID tag easy for a member to carry. The RFID tag may also have a form factor similar to that of a key fob or any other form factor. As the member travels throughout a metropolitan area in which the bicycle rental system is deployed, the member may present the RFID tag as a key at bicycle rental stations to unlock a bicycle for that member to rent.

In accordance with a conventional RFID tag distribution model, an operator of the system may receive membership registrations over the Internet. Using information collected during the registration process, an account may be established, that may include recording information to process payments for bicycle rentals. An identifier for the member, which may also be associated with the stored information, may be programmed on an RFID tag. That RFID tag may then be delivered to the member through the mail.

This approach of enrolling as a member in a bicycle rental system may take a week or more to complete. If a person desires to rent a bicycle before obtaining an RFID tag, the person may, instead of using the RFID tag, pay at the time of rental. Payment may be made by presenting a credit card to a payment station associated with a bicycle rental station.

SUMMARY

Aspects of the disclosure include a Radio Frequency Identification (RFID) key dispenser for programming an RFID key at the time of dispensing. The key dispenser may include storage for a plurality of keys to be dispensed and an RFID programming station with network access. The RFID programming station may be configured to program a key of the plurality of keys based on information received over the network from a processor system, and the storage may include a plurality of cartridges, each configured to store a portion of the plurality of keys.

Further aspects of the disclosure include a Radio Frequency Identification (RFID) key dispenser for programming an RFID key at the time of dispensing. The key dispenser may include first storage for a plurality of keys to be dispensed, an RFID programming station with network access. The RFID programming station may be configured to program a key of the plurality of keys based on information received over the network from a processor system. The RFID key dispenser may also include a dispensing area, second storage for a plurality of defective keys, and a key transport mechanism configured to transport a key from the first storage to RFID programming station and from the RFID programming station selectively to the dispensing area or the second storage based on a result of a programming attempt at the RFID programming station.

The disclosure also includes a method of operating a Radio Frequency Identification (RFID) key dispenser for programming an RFID key at the time of dispensing. The RFID key dispenser may include a plurality of key retrieval stations for holding a plurality of keys to be dispensed, each key retrieval station having a release mechanism. The RFID key dispenser may also include an RFID programming station with network access, wherein the RFID programming station is configured to program a key of the plurality of keys based on information received over the network from a processor system, and a key shuttle configured to transport a key from the first storage to RFID programming station and from the RFID programming station. The method may include moving the key shuttle successively adjacent to each of the plurality of key retrieval stations, the moving comprising, for each of the plurality of key retrieval stations, the key shuttle may engage the release mechanism of the key retrieval station upon passing adjacent to the key retrieval station. A key may move from a key retrieval station into an opening in the key shuttle when the key shuttle is aligned with the key retrieval station and the release mechanism of the key retrieval station is engaged and the opening in the key shuttle is not blocked by another key. The key shuttle may disengage the release mechanism upon moving away from the key retrieval station.

Aspects of the disclosure further include a Radio Frequency Identification (RFID) key dispenser for programming an RFID key at the time of dispensing. The key dispenser may include a cartridge for storing a plurality of keys to be dispensed, the cartridge comprising a first opening and a key retention member movably mounted adjacent to the first opening. The key dispenser also may include a biasing mechanism coupled to the key retention member and biasing at least a portion of the key retention member into the first opening. The key dispenser may also include a key transport device configured to pick up a key from the cartridge through the first opening, the key transport device movably mounted for movement along a path. The key transport device may include a first surface and a second, opposing surface. The key transport device may also include a second opening between the first surface and the second surface, the second opening being sized to receive a key of the plurality of keys, and outer walls configured to contact the key retention member as the key transport device passes under the first opening while moving along the path to bias the key retention member out of the first opening when the second opening aligns with the first opening.

The foregoing is a non-limiting summary of the invention, which is defined by the appended claims.

DETAILED DESCRIPTION

Figure 1:
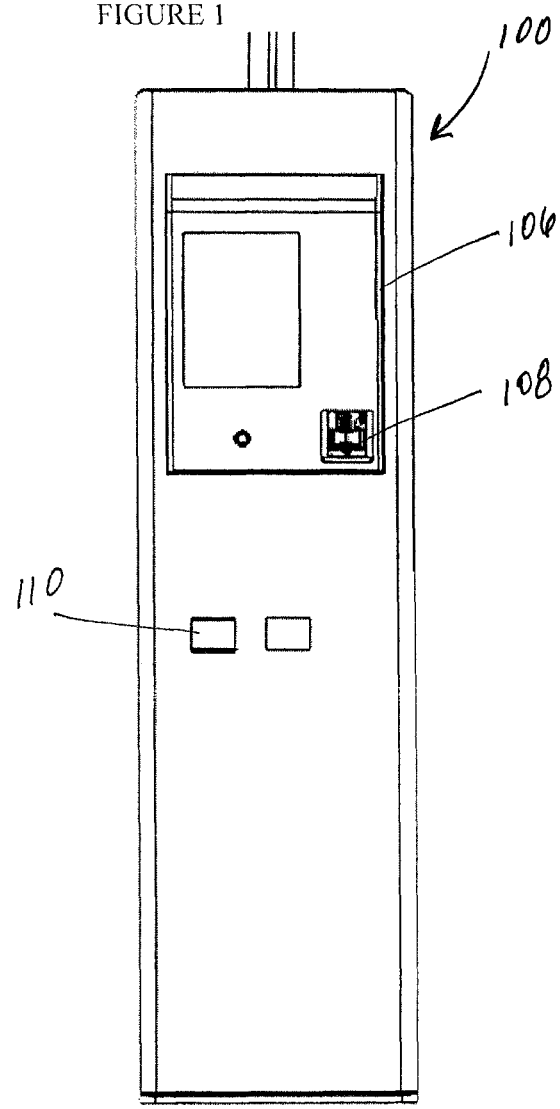
FIG. 1 is a front view of a terminal with an RFID key dispenser, according to one illustrative embodiment.

The inventors have recognized and appreciated design techniques for an RFID key dispenser that will support unattended operation of the key dispenser. The key dispenser may be relatively compact, yet hold a large numbers of keys for dispensing. The key dispenser may be readily serviced, such as by incorporating key holders that enable the supply of keys for dispensing to be readily replenished. Additionally, the key dispenser may contain features that reduce the need for service, such as sensors for tracking a supply of keys and reporting an indication when the supply is low and/or when the supply is adequate, such that an operator of the key dispenser may service it when the key supply is below a first threshold, but forego servicing when the key supply is above a second threshold.

The key dispenser also may contain features that support security. The key dispenser may include a lockable enclosure to protect against unauthorized access to the keys. Additionally, keys stored within the key dispenser may be blank, without any identifying information stored on them, until the time at which they are to be dispensed. Appropriate information for programming on a key to be dispensed and/or authentication of a person to whom a key is to be dispensed may be obtained via a network at the time of dispensing the key. As a result, even if unauthorized access to the keys were gained, the keys would be unusable within the system with which they were intended to be used.

Further, the key dispenser may be robust. A simple mechanical arrangement may support retrieving a key from any of a number of key retrieval stations. Moreover, the system may be designed such that a faulty key or a key that undergoes a faulty programming operation can be detected and diverted to a reject collection area, rather than being dispensed to a customer. These operations all may be achieved using a carriage that is driven linearly. The linear range of motion may encompass regions adjacent to key retrieval stations, an RFID programming station, a dispensing station, and a reject collection station.

In this way, simple linear motion of the carriage may achieve any of a number of operations. For example, in some embodiments, the carriage and release mechanisms on the key retrieval stations may be shaped such that linear motion of the carriage past each of multiple key retrieval stations loads only one key, or other predetermined number of keys, in the carriage. Further linear motion of the carriage may position the carriage adjacent to a programming station. Yet further linear motion, which depending on direction, will position the carriage adjacent to the dispensing area or the reject collection area. Moreover, structures adjacent to the linear path of the carriage may restrain a key within an opening (or recess) of the carriage in some regions while allowing the key to drop out of the opening when the carriage is adjacent to other regions, such as the dispensing area or the reject collection area.

Moreover, because the carriage may be configured to hold only one of a predetermined number of keys, it may pass under any number of key retrieval stations and only trigger release of one key. Such a feature enables multiple key retrieval stations that can hold a large quantity of keys to be positioned adjacent to a linear track of the carriage. These key retrieval stations may operate as together without active control of the release mechanisms.

Moreover, such a shuttle or other carriage that acts as a key transport mechanism that is configured to not release further keys when it already contains its predetermined number of keys can pass under the key retrieval stations multiple times, even when holding a programmed or defective key. In this way, two key release areas may be provided at opposing ends of the track for the carriage. These key release areas may also be passive, not requiring electromechanical or other controlled actuators to release keys from the carriage.

Such an arrangement allows for a simple control method, which can be implemented by controlling when to move the carriage and in which direction.

In some embodiments, the method of operating a key dispenser may include moving the key shuttle successively adjacent to each of any number of key retrieval stations. The moving may include, for each of the key retrieval stations, the key shuttle engaging the release mechanism of the key retrieval station upon passing adjacent to the key retrieval station. The moving may also include a key moving from a key retrieval station into an opening in the key shuttle when the following conditions are met: the key shuttle is aligned with the key retrieval station, the release mechanism of the key retrieval dispensing station is engaged, and the opening in the key shuttle is not blocked by another key. The moving may also include the key shuttle disengaging the release mechanism upon moving away from the key retrieval station. Moreover, a single key may be mechanically selected from any number of key retrieval stations based on motion of the key shuttle. Alternatively, the moving may include moving the key shuttle between predetermined positions, which may include a position adjacent to each of the key retrieval stations, a position at a programming station, a position adjacent to a key dispensing area, and a position adjacent to a storage area for defective keys.

A key dispenser, improved using some or all of the techniques described herein, may enable a distributed system that supports a membership model. Members may obtain an RFID key at any location at which an RFID key dispenser is installed. That RFID key may be used to identify the holder as a member of the system at any user interface to the system.

For example, a bicycle rental system may have multiple rental stations around a metropolitan area. People may rent a bicycle at any one of these rental stations by identifying themselves as members of the system at a user interfaces associated with any rental station. An RFID key may be used to identify the person as a member such that an account of the user may be charged for rental of the bicycle. Any person wishing to become a member of the rental system may interact with a key dispenser to obtain a key and then use it at a bicycle rental station.

In some embodiments, the key dispenser may be integrated into a bicycle rental station or installed in a location where a prospective member might access it. In some embodiments, the key dispenser may be integrated with a payment station at the bicycle rental station or elsewhere in the vicinity of the bicycle rental stations. For example, the key dispenser may be integrated with a payment station used to collect payment for parking. Regardless of other functions of the payment station, it may provide an interface through which a user can provide information to establish a membership. The information provided may be stored, such as on a remote server, about the membership or the member or to acquire information that is programmed on the RFID key.

Nevertheless, the key dispenser is not limited to use in connection with a bicycle rental station. In some embodiments, the key dispenser may be used in connection with a parking payment system in which "members" have accounts that are debited as payment for parking.

Turning now to the figures, FIG. 1 illustrates a bicycle rental station 100 or other kiosk that may incorporate an RFID key dispenser 200 for dispensing RFID keys 204 to be used to rent a bicycle. The rental station 100 may include a user interface 106, a payment interface 108 such as a credit card reader, and a key dispenser output 110 to retrieve a dispensed key 204. These components may be controlled by a microcontroller or other suitable processor or processors. Using techniques as may be known in the art, the controller may acquire payment information, identity information, and/or other information to determine whether to program and dispense a key. This information may be acquired in whole or in part through the user interface and/or via network wired or wireless communication with a remote sensor or other device. For example, the key dispenser may have a component or components with wired or wireless access to internal and/or external networks including the Internet and may receive information over the networks from a processor system. Regardless of the manner in which the data is acquired, once acquired, a key 204 may be programmed with the data by controlling components as described below.

Figure 2:
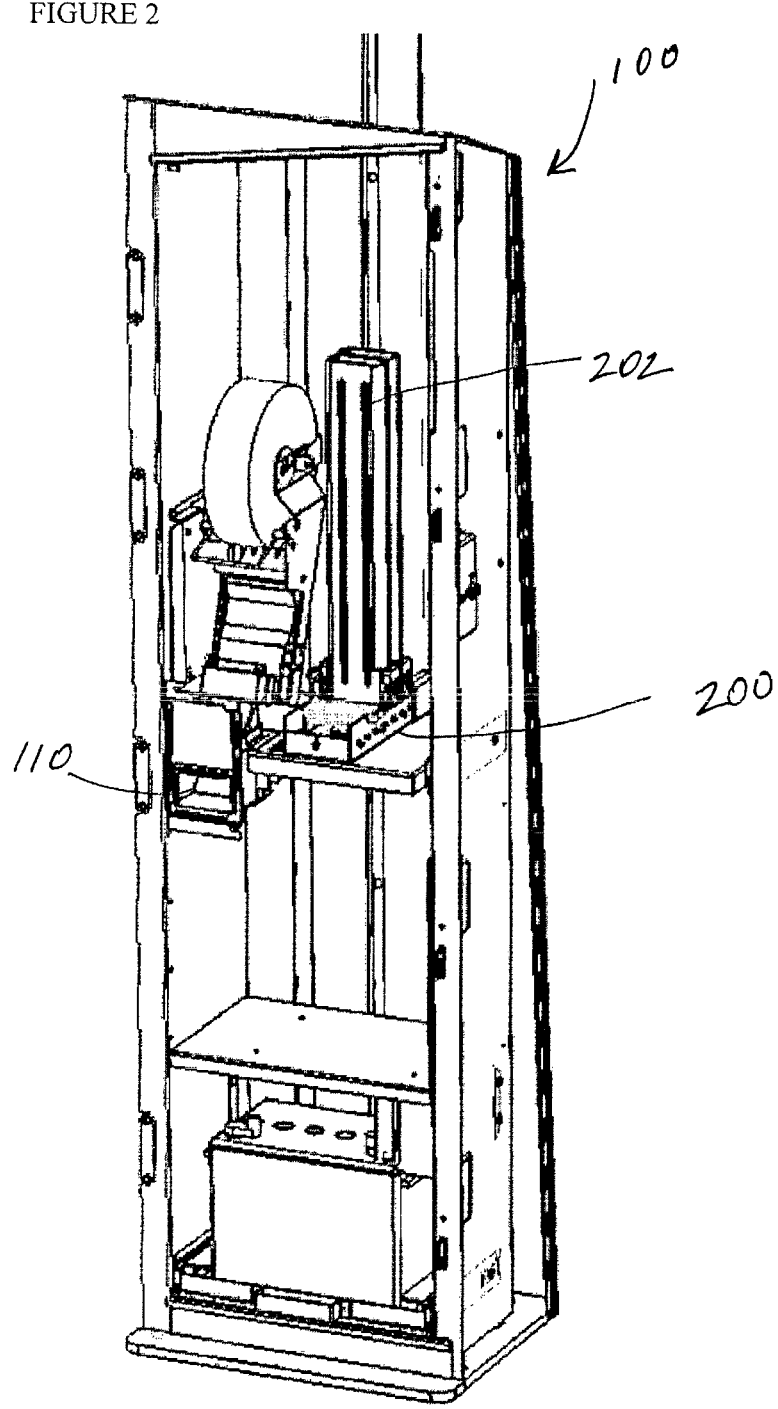
FIG. 2 is a perspective view of the terminal of FIG. 1 with the front cover removed, illustrating an RFID key dispenser according to one illustrative embodiment.

FIG. 2 shows an interior view of a key dispenser 200 according to some embodiments. The key dispenser 200 may include any number of cartridges 202 (the storage or first storage) for storing a plurality of keys 204. The cartridges 202 may be removably attached to a base 206 of the key dispenser 200 such that an empty cartridge 202 may be removed and a filled cartridge 202 may be installed. Alternatively, the cartridges 202 may be permanently installed and refilled with keys 204 when the cartridges 202 become empty or have a predetermined number of keys 204 remaining. The cartridges 202 may have an internal shape matched to the shape of the keys 204 and may allow stockpiling of keys 204.

Figure 3:
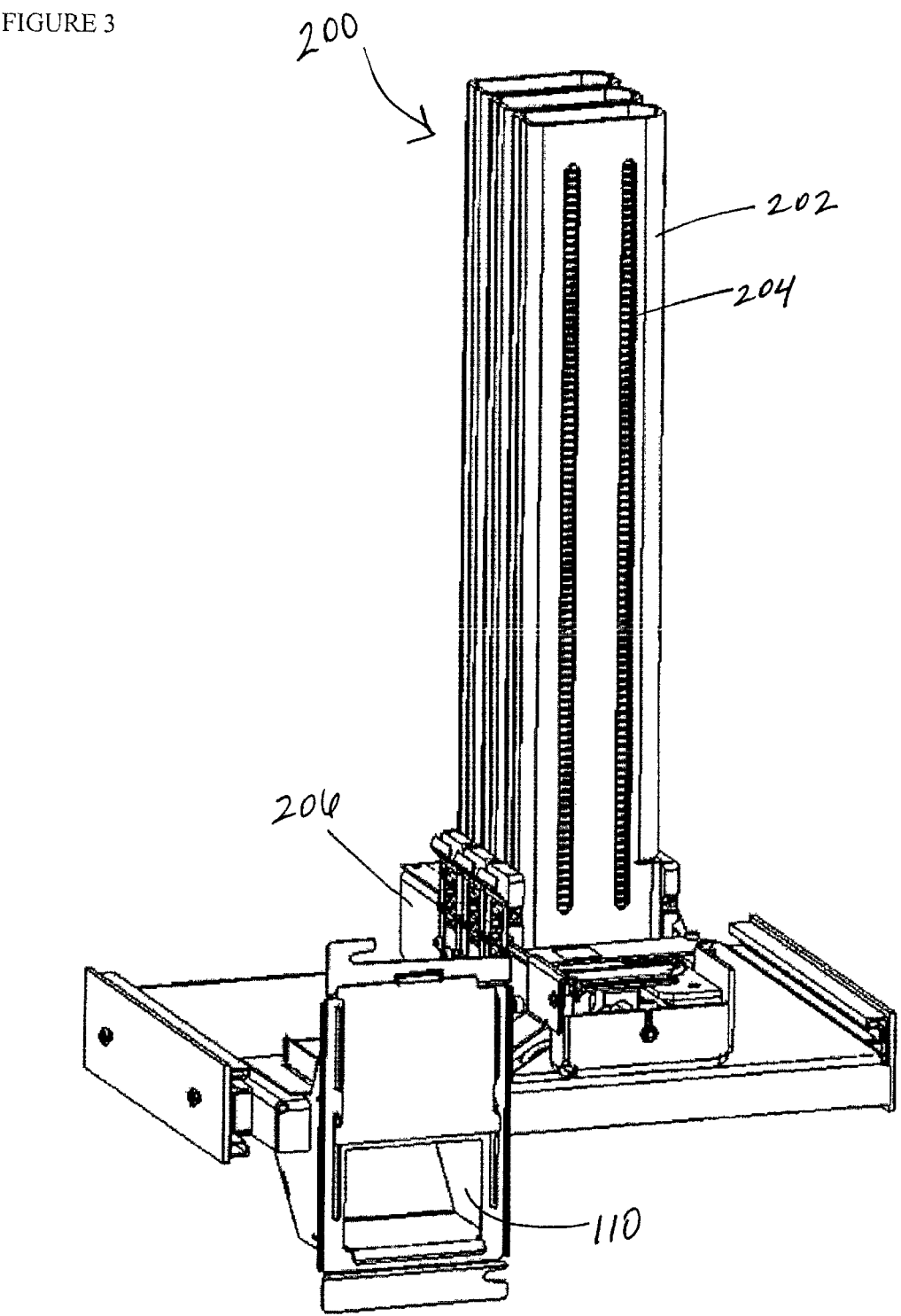
FIG. 3 is a perspective view of a key dispenser according to one embodiment.

FIG. 3 shows the cartridges 202, separate from the kiosk attached to base 206. Base 206 may contain a track on which a carriage (not shown) or other key transport device may move. This track may support linear motion of the carriage.

The base 206 may have a key release area that may be coupled to dispenser output 110 through a channel (not numbered) through which a key 204 may pass. As shown, dispenser output 110 may be below base 206 so that a key 204 may pass from the key release area to dispenser output 110 by action of gravity.

Figure 4:
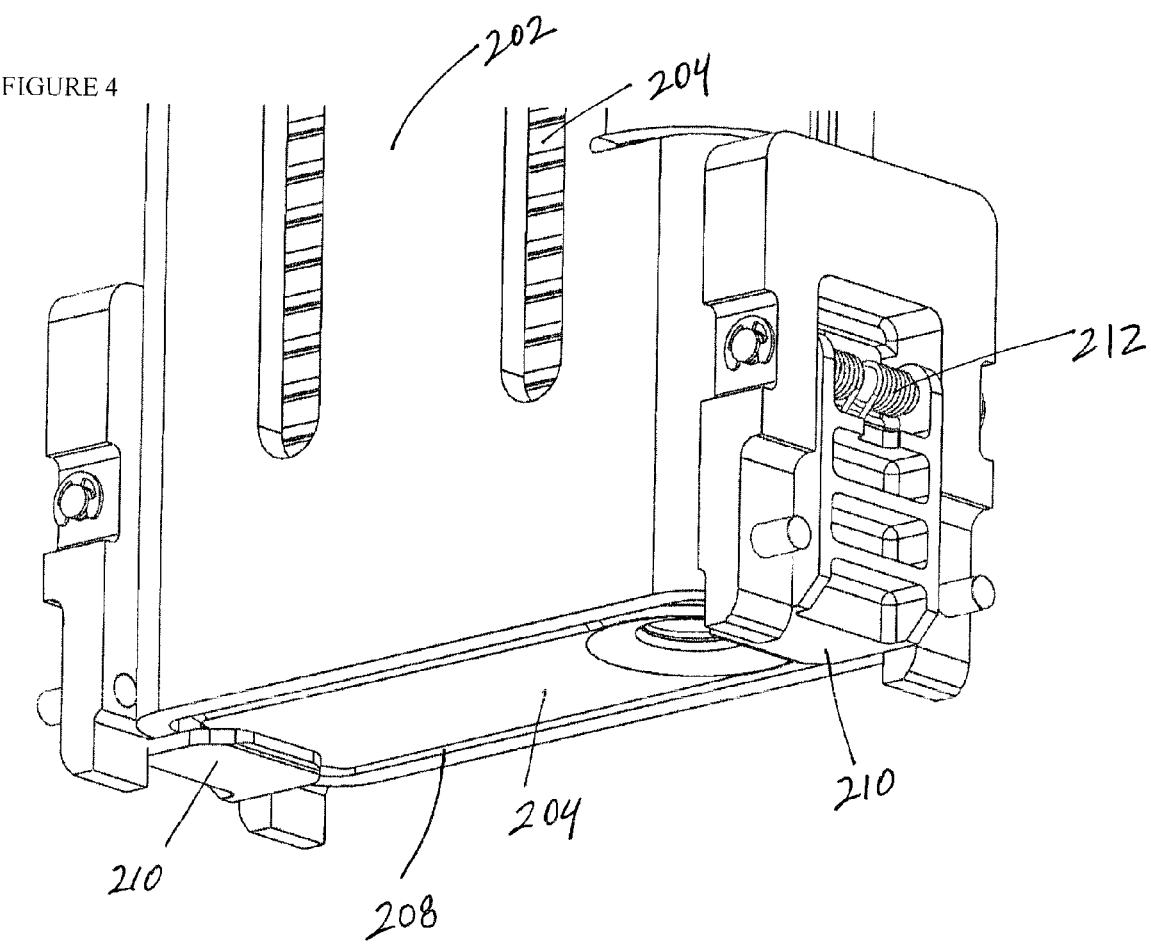
FIG. 4 is a bottom perspective view of a cartridge with key retention members according to one illustrative embodiment.

FIG. 4 shows a lower portion of a cartridge 202. The portion of cartridge 202 visible in FIG. 4 is attached to base 206 to be adjacent the track for the carriage.

As shown in FIG. 4, the cartridge may include a housing with an opening 208 and retention members 210 that partially block the opening 208 to prevent the keys 204 from escaping. In one embodiment, the key retention members 210 may be biased to cover a portion of the opening 208 by a spring mechanism 212 coupled between the housing and the key retention members 210. In operation, a carriage (not shown) moving along the track may pass adjacent to opening 208. The carriage may be shaped to move the key retention members 210 to release a key 204. When a key 204 is to be retrieved, the key retention members 210 may move out of the opening 208 and allow a key 204 to drop through the opening 208 due to the force of gravity. The remaining keys 204 in the cartridge 202 will drop toward the opening 208 when a key 204 has been retrieved. Alternatively, the keys 204 may be pushed toward the opening 208 by a spring or other device during retrieval.

Figure 5:
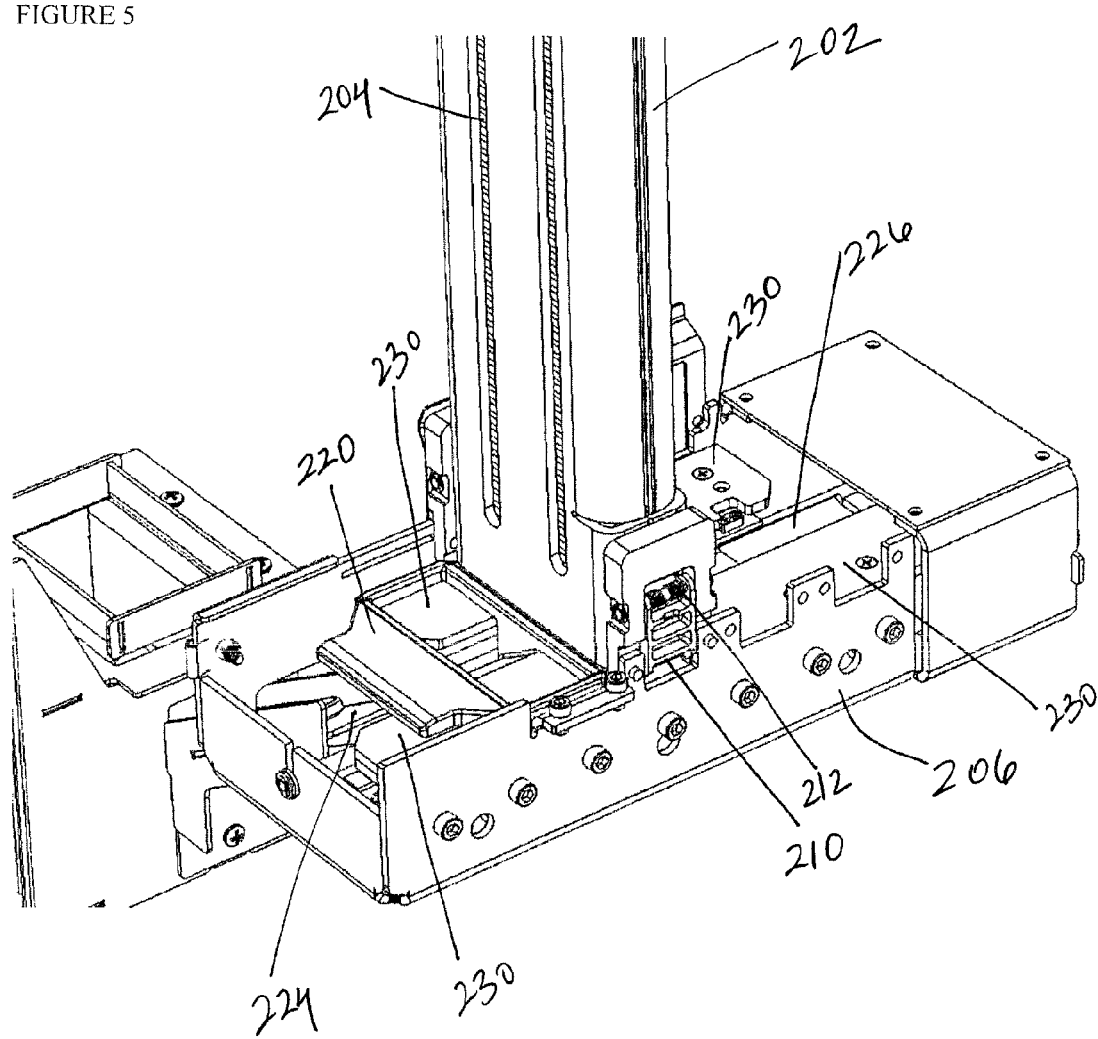
FIG. 5 is a perspective view of a portion of the RFID key dispenser of FIG. 2.
Figure 6:
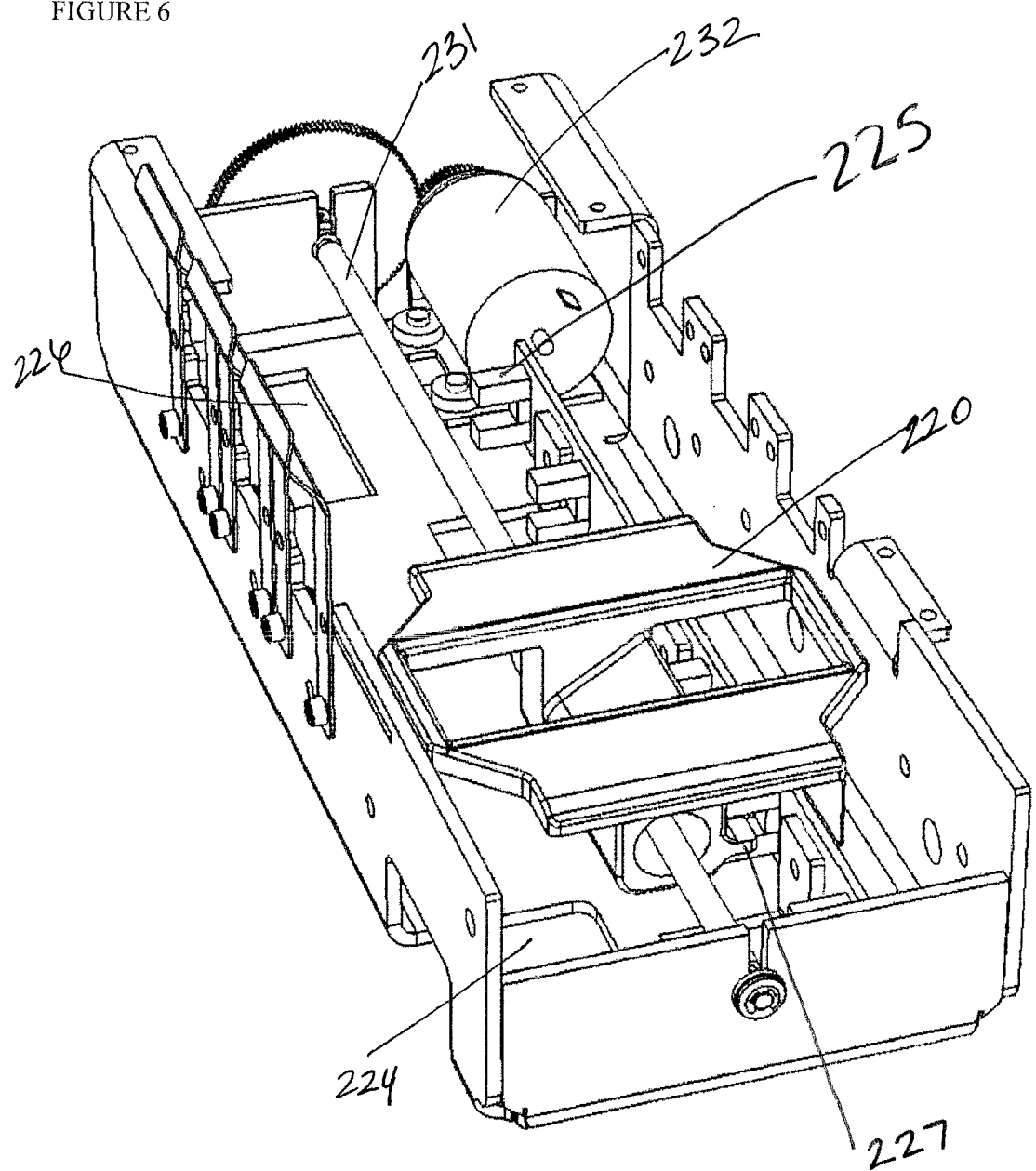
FIG. 6 is a perspective view of a key transport device and a portion of the RFID key dispenser, according to one illustrative embodiment.
Figure 21:
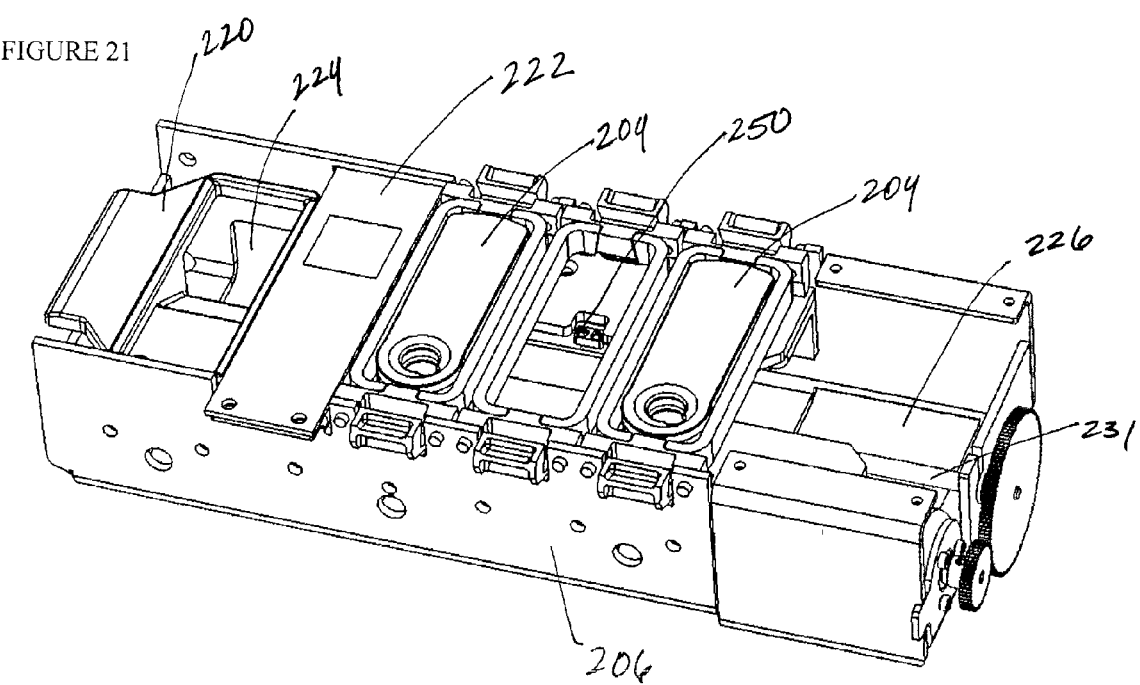
FIG. 21 is a top perspective view of a portion of the RFID key dispenser.

According to one embodiment, the key dispenser 200 may include a carriage or other key transport device 220, as shown in FIGS. 5 through 7, for retrieving, transporting, and dispensing a key 204. Once the key transport device 220 has retrieved a key 204, the key transport device 220 may transport the key 204 to three possible positions or stations: an RFID programming station 222, a dispensing station 224, and a rejected key station 226, as shown in FIG. 21. At the programming station 222, the key 204 may be programmed by an RFID printed circuit board (PCB) antenna (at 222) to write membership information in the key 204. The RFID antenna may also test the key 204. If the key 204 is working properly, the key transport device 220 may transport the key 204 to a dispensing station 224. If a defect is detected, the key transport device 220 may transport the key 204 to a rejected key station 226.

According to some embodiments, the RFID programming station 222 may have wired or wireless access to internal and/or external networks including the Internet and may receive information over the networks from a processor system. The processor system may include a central processing unit (CPU), a memory, and any other components that may be known in the art.

The position of the key transport device 220 may be sensed using infrared (IR) slot sensors 225 (shown in FIG. 6) mounted on an elongated PCB. Each sensor 225 may be positioned such that it becomes obstructed when the key transport device 220 has reached a specific position. The IR slot sensors 225 may be triggered by an IR slot sensor trigger 227, shown in FIGS. 6 and 8 through 12.

FIGS. 5 and 6 illustrate how the key transport device 220 may transport a key 204 according to one embodiment. The key transport device 220 may move linearly by means of any of a number of mechanisms, including a lead screw 231 driven by a motor 232. In the embodiment shown, a motor 232 may drive the lead screw 231 to the appropriate position when prompted. For example, when a user visits the bicycle rental station, the user may purchase a rental agreement and retrieve a key 204. The rental station may prompt the motor 232 to drive the lead screw 231 to move the key transport device 220, if empty, to pick up a key 204 from a cartridge 202, transport the key 204 to the programming station 222, and then transport the key 204 to either the dispensing station 224 or the rejected key station 226. Any suitable component or components may be used to cause this linear movement.

According to one embodiment, when the key transport device 220 transports a key 204, a bottom surface of the key 204 rests on a key floor 230 to support the key, as shown in FIG. 5. The key floor 230 may be one or more plates forming the floor. The key floor 230 may include cutouts at the dispensing station 224 and at the rejected key station 226. Alternatively, the key floor 230 may not extend over the dispensing station 224 or the rejected key station 226. Due to the cutout or lack of a key floor 230, when transported to the dispensing station 224 or the rejected key station 226, the key 204 may no longer be supported by the key floor 230 and may drop into a dispenser output 110 or a rejected key storage area (second storage) (not shown).

According to some embodiments, the key transport device 220 may include an opening (the recess 242) that is sized to receive a key 204. The key transport device 220 may be mounted to move within a first region (adjacent to the opening 208), a second region (the rejected key station 226) and a third region (the dispensing station 224). The first region may be adjacent to a first key storage area, such as the cartridges 202. The second region may be adjacent to second key storage area, such as the rejected key storage area. The third region may be adjacent to the dispensing area. The key floor 230 may include a first key surface and a second key surface, the two of which are opposite to each other across the path of motion of the key transport device 220. The key transport device 220 may be adjacent the first key surface and the second key surface in the first region such that the first key surface blocks a first portion of the opening 242 in the first region and the second key surface blocks a second portion of the opening 242 in the first region. The first key surface and/or the second key surface is configured such that, in the second region and the third region, at least one of the first portion of the opening 242 or the second portion of the opening 242 is unblocked. This may allow the key 204 to drop into a dispenser output 110 or a rejected key storage area (not shown). According to some embodiments, the first region, the second region, the third region, and the RFID programming station 222 may be arranged along a linear path of motion of the key transport device 220. The second region and the third region may be positioned on opposite sides of the RFID programming station. The second region and the third region may also be positioned on opposite ends of the linear path of motion of the key transport device 220.

Figure 8:
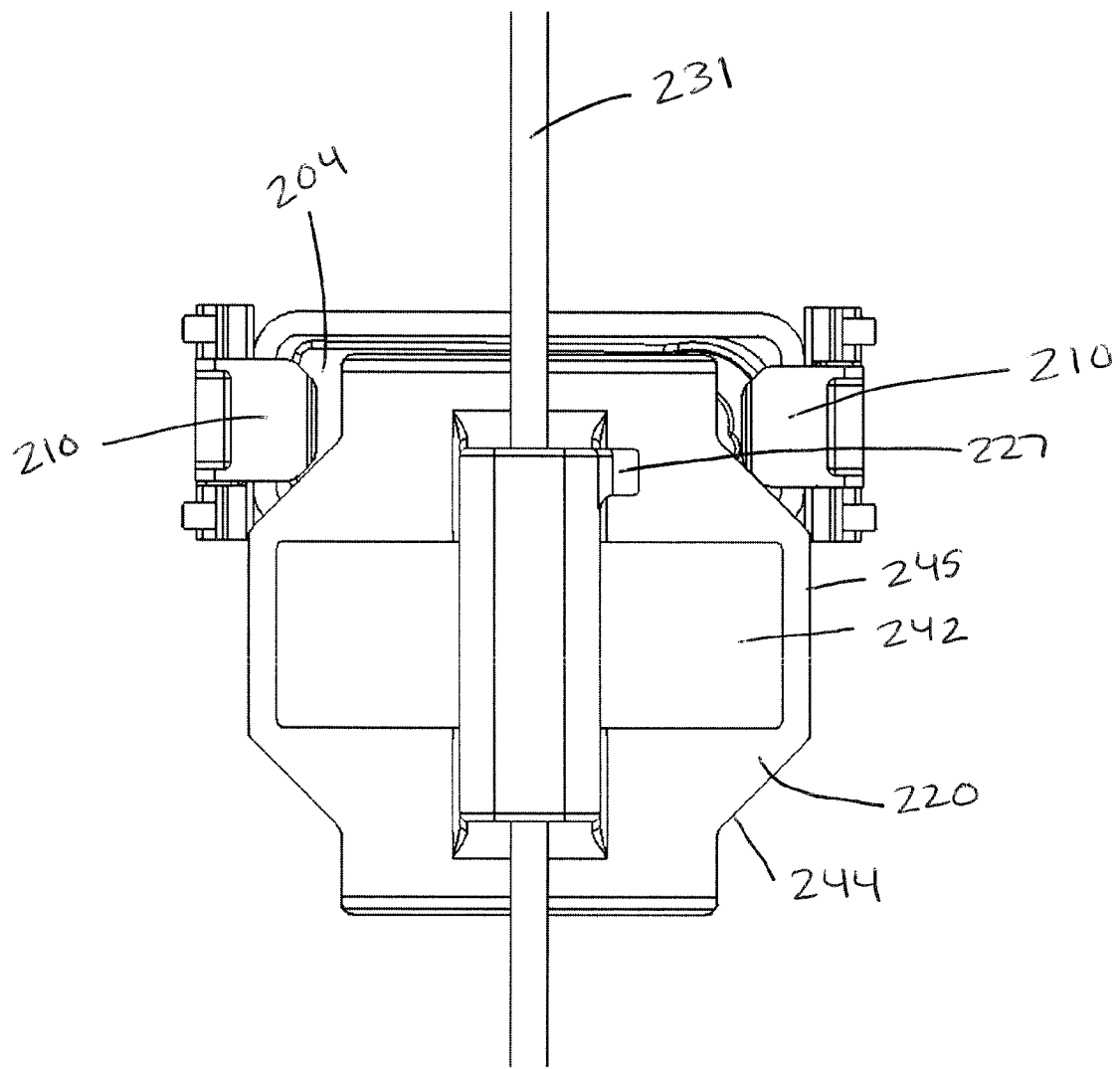
FIG. 8 is a bottom view of the key transport device as it begins to pass under a cartridge, according to one embodiment, when the key retention members are blocking the opening of the cartridge.

In the embodiment illustrated in FIGS. 4, 5, and 8, the key dispenser 200 may include a cartridge 202 with a first opening 208 and a key retention member 210 mounted in a movable way adjacent the first opening 208. The key dispenser 200 also may include a biasing mechanism coupled to the key retention member 210, biasing at least a portion of the key retention member 210 into the first opening 208. The key dispenser may also include a key transport device 220 configured to pick up a key 204 from the cartridge 202 through the first opening 208. The key transport device 220 may be mounted in a movable way for movement along a path. The key transport device 220 may include a first surface and a second, opposing surface. The key transport device 220 may also include a second opening (recess 242) between the first surface and the second surface. The second opening may be sized to receive a key 204. The key transport device 220 may also include outer walls 245 configured to contact the key retention member 210 as the key transport device 220 passes under the first opening 208 while moving along the path to bias the key retention member 210 out of the first opening 208 when the second opening aligns with the first opening 208. The key dispenser 200 may also include a support surface (key floor 230) adjacent the second surface. The support surface may be adjacent to a portion of the second opening over a portion of the path.

Figures 7A, 7B, 7C:
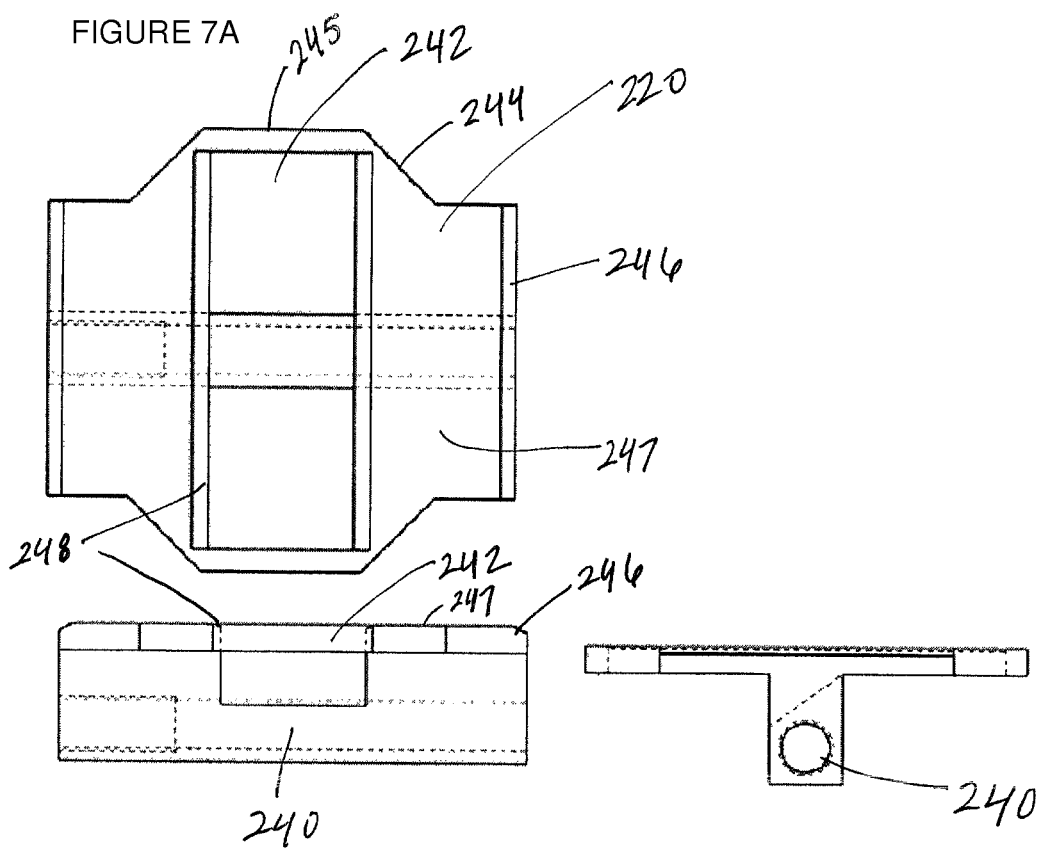
FIG. 7A is a top view of the key transport device of FIG. 6.
FIG. 7B is a front view of the key transport device of FIG. 6.
FIG. 7C is a side view of the key transport device of FIG. 6.

As shown in FIGS. 7A-C, the key transport device 220 includes design features to efficiently manage the retrieving, transporting, and dispensing of a key 204. A bottom side of the key transport device 220 may include a through hole 240 for connecting to the lead screw 231 for moving the key transport device 220. The key transport device 220 may include a recess (an opening) 242 for loading a key 204 from a cartridge 202. The depth of the recess 242 may be sized to allow only one key 204 to enter the recess 242 (e.g., the key 204 fits between key floor 230 and a top surface 247 of the key transport device 220). When the key transport device 220 passes under a cartridge 202 containing at least one key 204, a key 204 may drop into the recess 242 of the key transport device 220.

Figure 9:
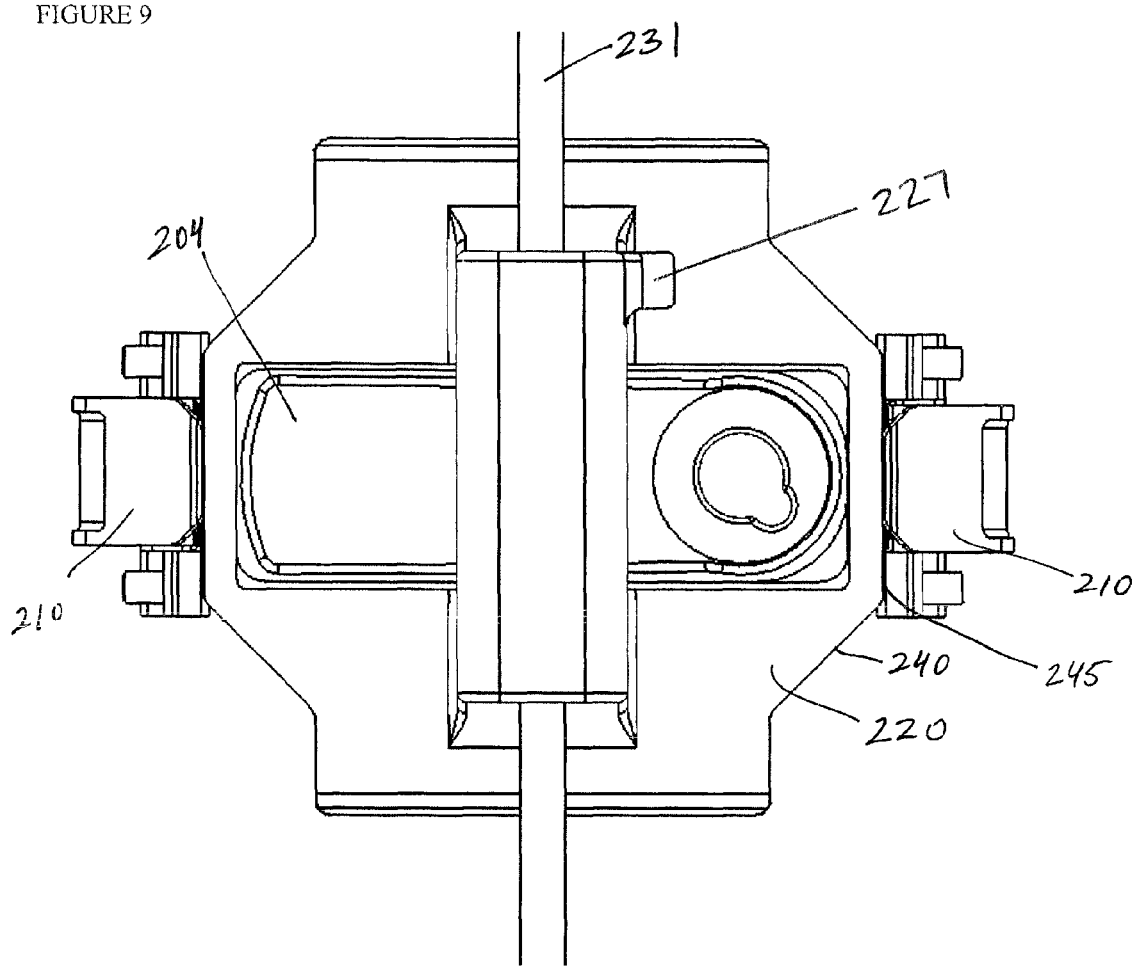
FIG. 9 is a bottom view of the key transport device of FIG. 6 when a recess of the key transport device aligns with a key and the key retention members are moved out of the opening.
Figure 10:
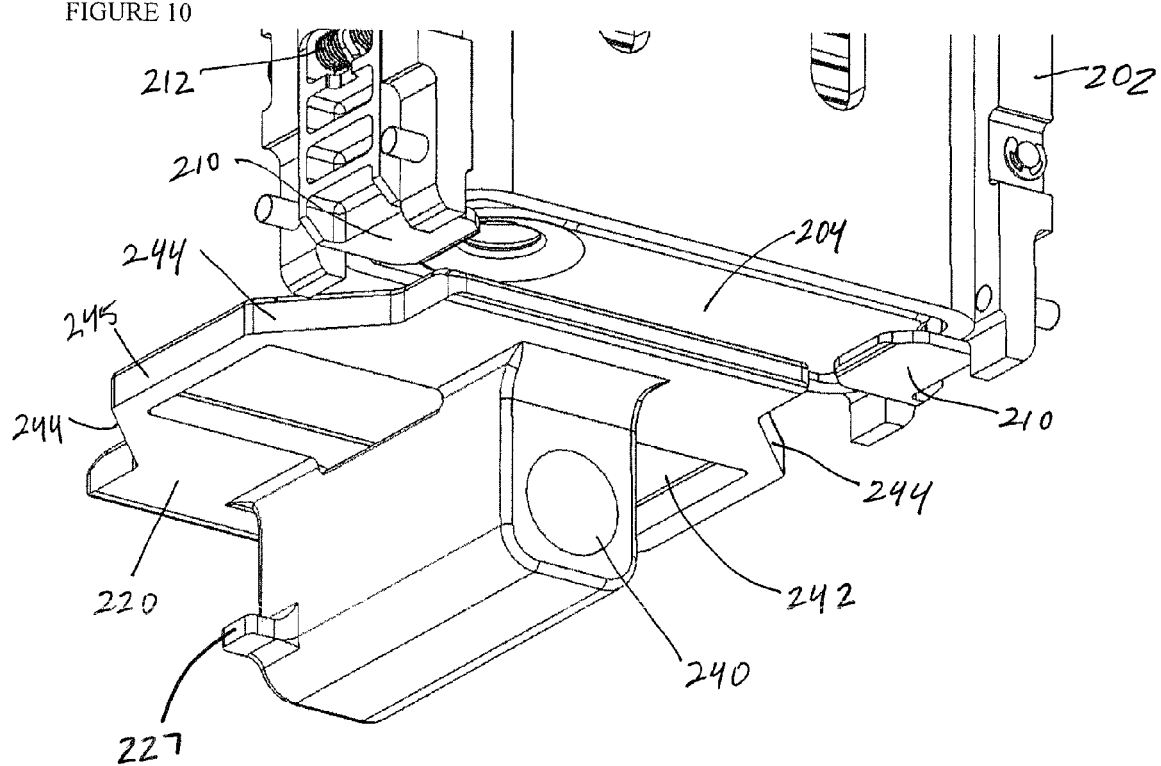
FIG. 10 is a bottom perspective view of the key transport device according to one embodiment as it begins to travel under a cartridge.
Figure 11:
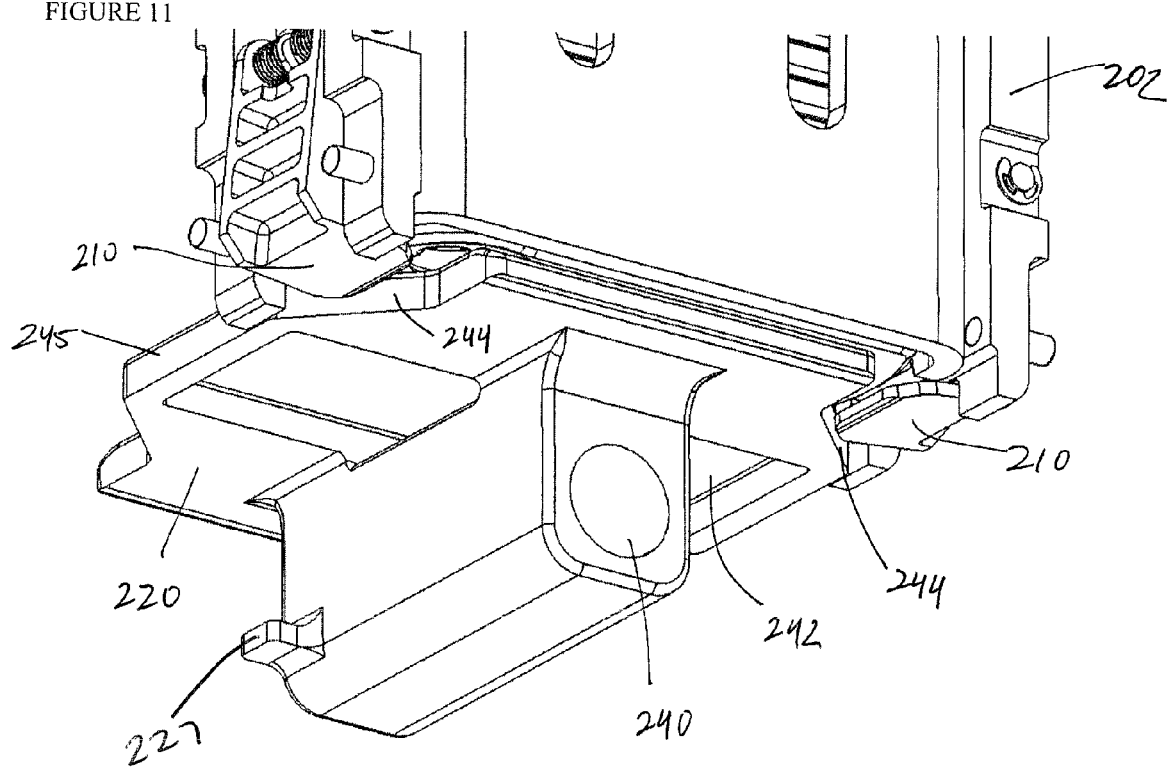
FIG. 11 is a bottom perspective view of the key transport device according to one embodiment as it travels under a cartridge.
Figure 12:
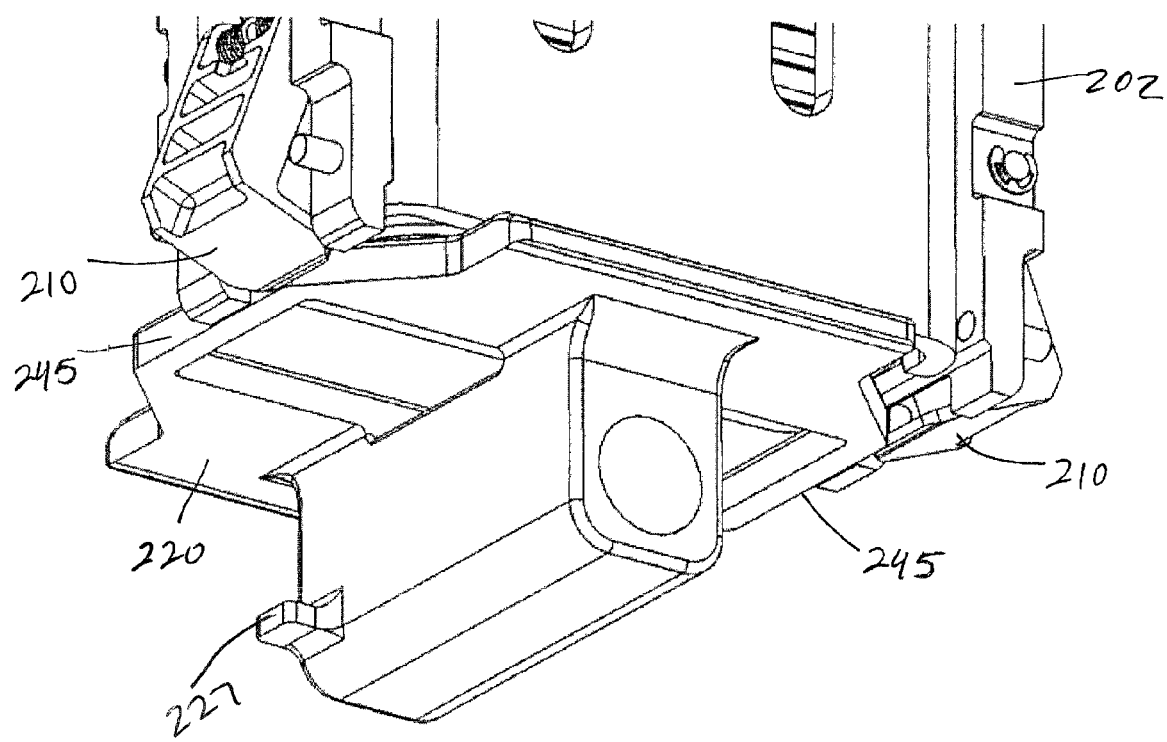
FIG. 12 is a bottom perspective view of the key transport device according to one embodiment as it travels under a cartridge.

According to one embodiment, the key transport device 220 may also include outer walls configured to contact and push the key retention members 210 away from the opening as the key transport device 220 moves under a cartridge 202. Without the key retention members 210 obstructing the opening 208, one or more keys 204 may be released from the cartridge 202. For example, the key transport device 220 may include angled outer walls 244. As shown in FIGS. 8 through 12, when the key transport device 220 moves under a cartridge 202, the key retention members 210 slide along the angled outer walls 244 and are pushed away from the opening 208. When the key transport device 220 is positioned under the opening 208, as shown in FIG. 9, the key retention members 210 rest on outer walls 245, completely unblocking the opening 208 and allowing a key 204 to drop into the recess 242. The key transport device 220 may include angled outer walls 244 on both sides of the key transport device 220 such that the key retention members 210 may be pushed out of the opening 208 when the key transport device 220 travels in either direction.

Figure 13:
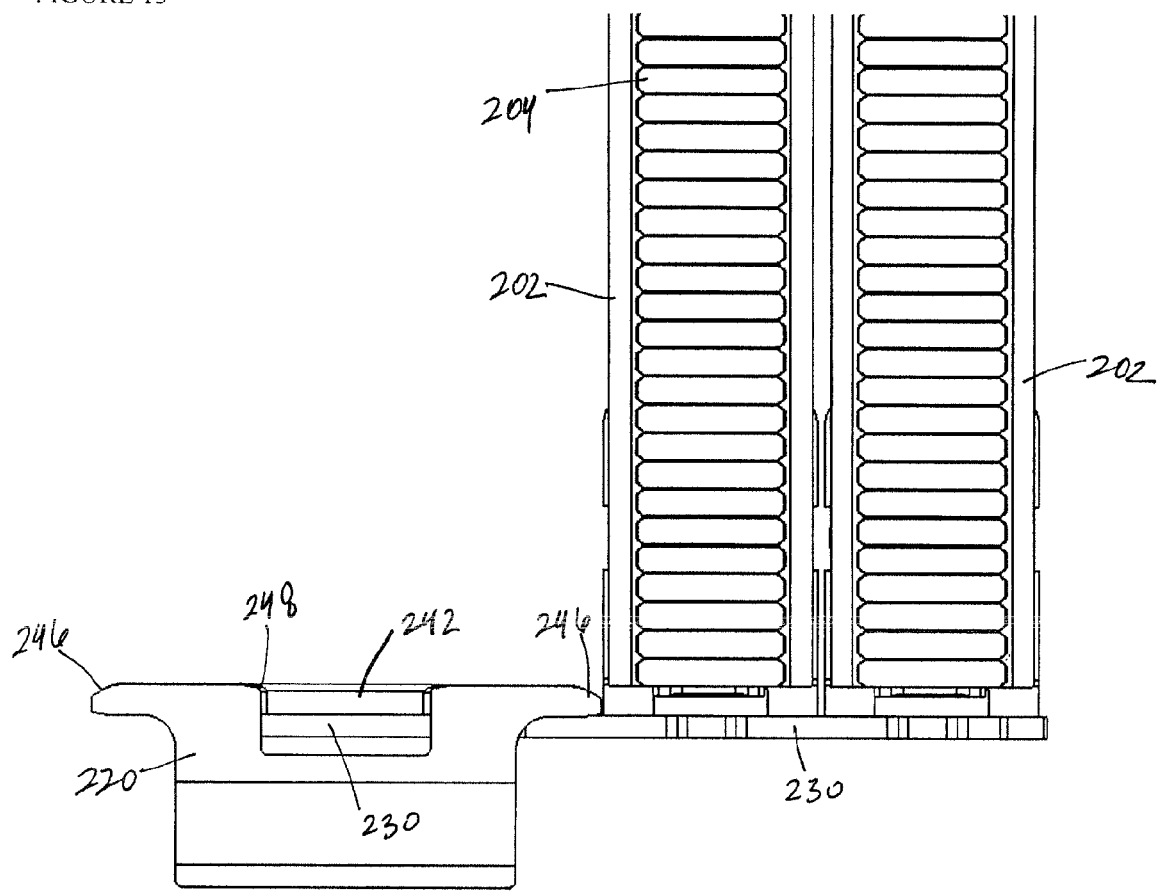
FIG. 13 illustrates a mechanism of the key transport device, according to one illustrative embodiment, when the key transport device travels toward a cartridge containing a plurality of keys.
Figure 14:
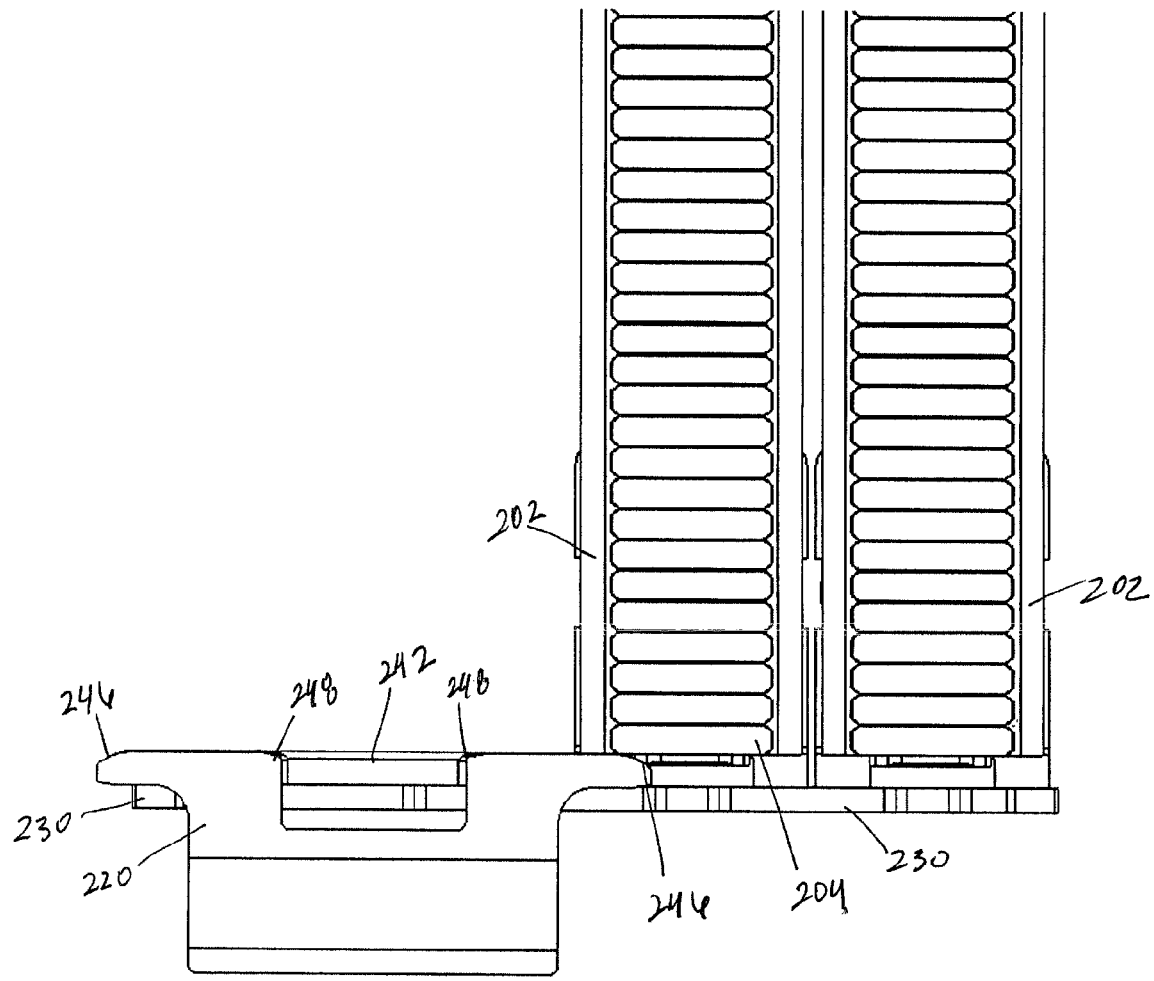
FIG. 14 illustrates a mechanism of the key transport device, according to one illustrative embodiment, when the key transport device begins to pass under a cartridge containing a plurality of keys.
Figure 15:
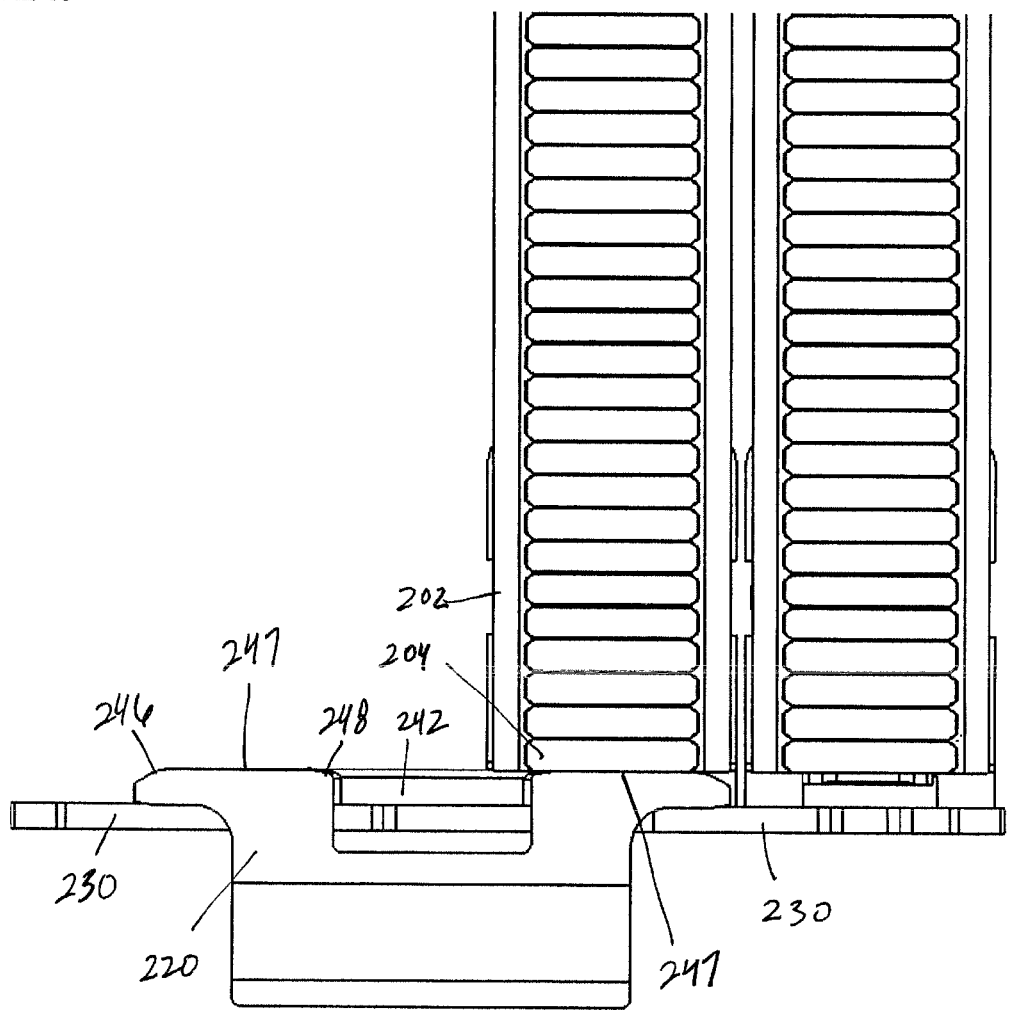
FIG. 15 illustrates the key transport device passing under a cartridge containing a plurality of keys.
Figure 16:
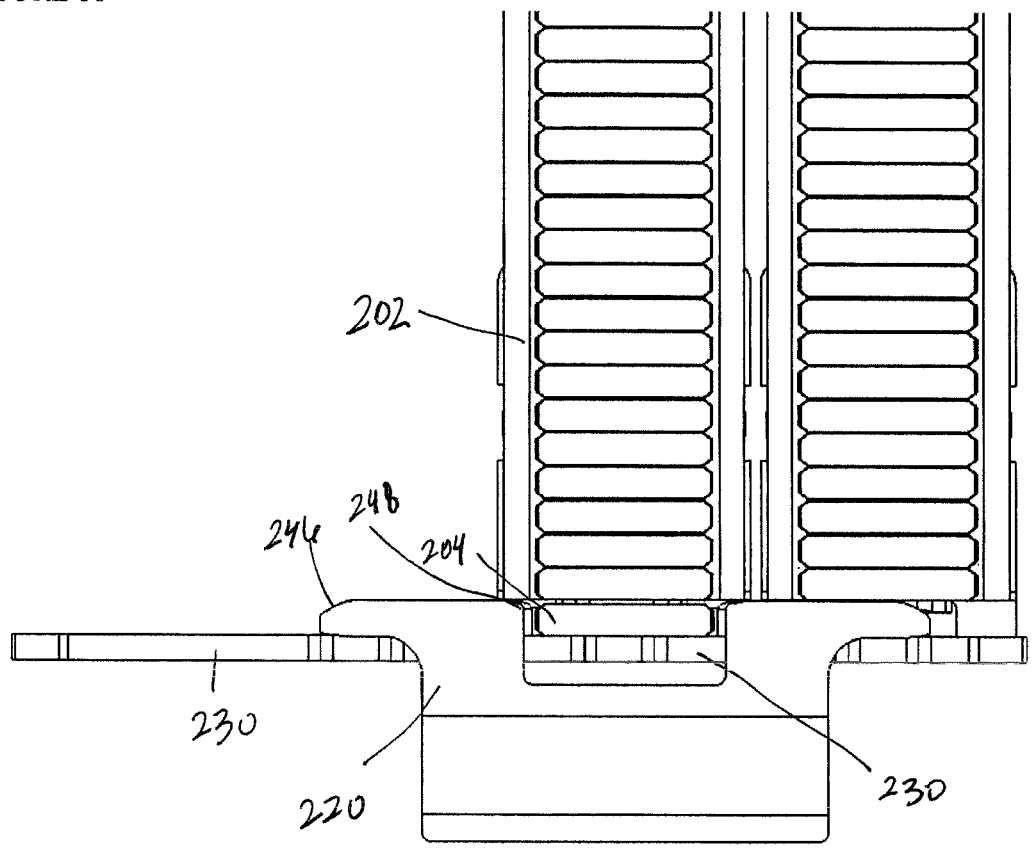
FIG. 16 illustrates the key transport positioned under an opening of a cartridge containing a plurality of keys.

FIGS. 13 through 20 illustrate the key transport device 220 as it passes under a cartridge 202 to retrieve, transport, and dispense a key 204 according to one embodiment. In FIG. 13, the key transport device 220, not containing a key 204, travels toward a cartridge 202. In FIG. 14, as the key transport device 220 approaches a cartridge, a rounded edge 246 contacts a key 204 in the cartridge. The rounded edge 246 may slightly lift the keys 204 in the cartridge to allow the key transport device 220 to pass under the cartridge 202. As the key transport device 220 passes under the cartridge 202, the angled outer walls 244 start to push the key retention members 210 away from the opening 208. As shown in FIG. 15, an upper surface 247 of the key transport device 220 supports and prevents the keys 204 from dropping through the opening while the key retention members 210 are pushed away from the opening 208. FIG. 16 shows a key 204 dropping into the recess 242 when the key transport device 220 is positioned under the opening 208. The key 204 may rest and travel on the key floor 230 when in the recess 242 while being transported.

Figure 17:
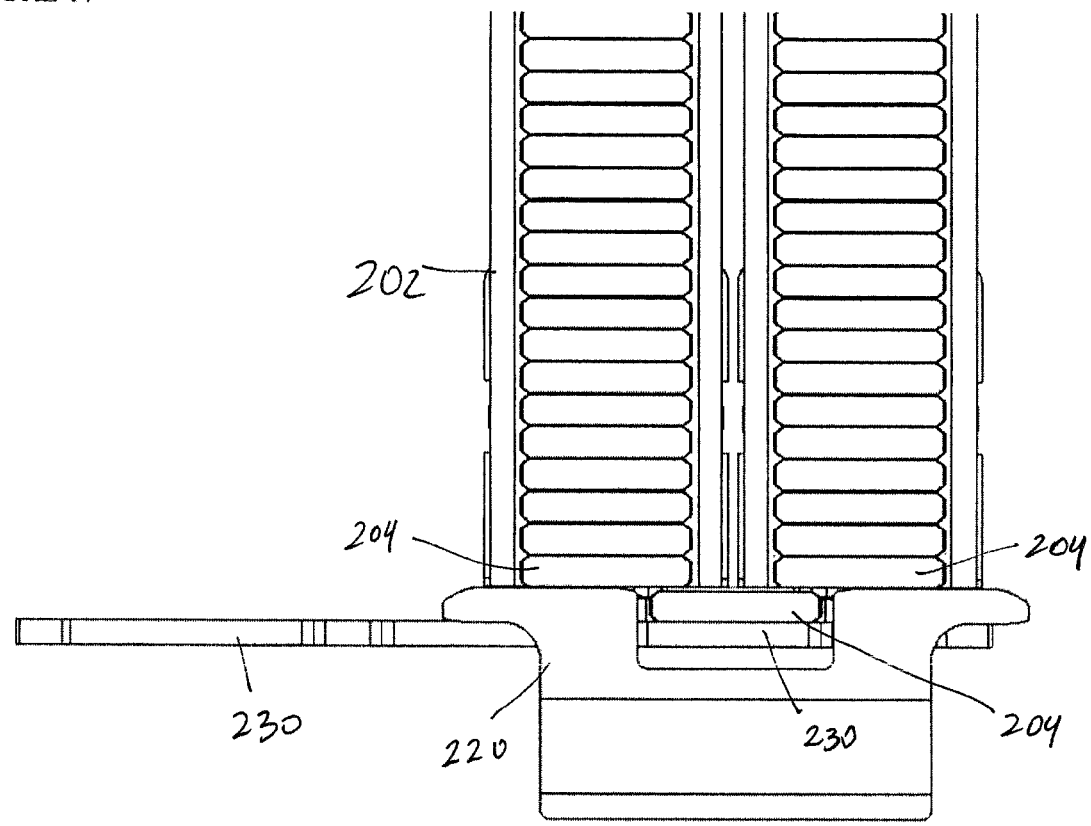
FIG. 17 illustrates the key transport device having passed under a cartridge containing a plurality of keys.
Figure 18:
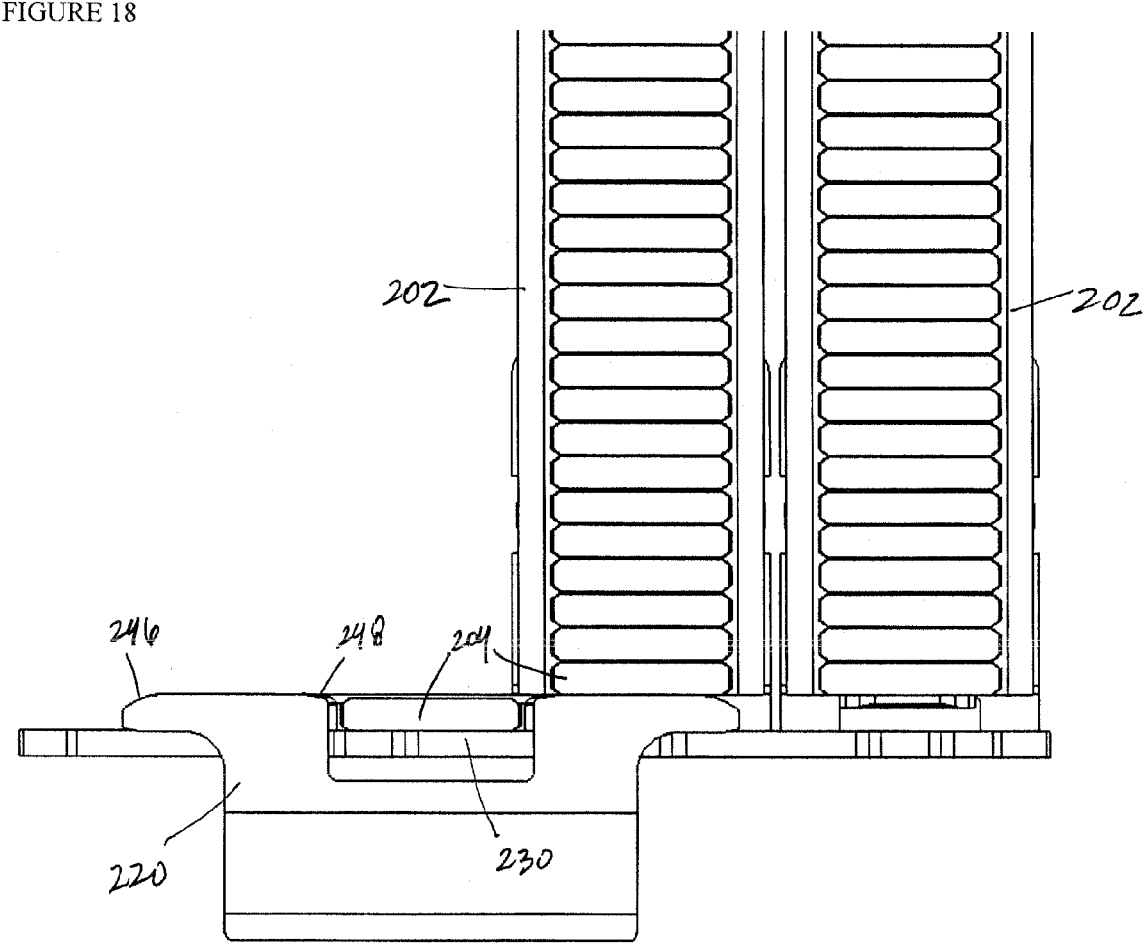
FIG. 18 illustrates the key transport device transporting a key.

Once a key 204 has been deposited in the recess 242, the key 204 in the recess 242 and the upper surface 247 may act as support to prevent any more keys 204 from dropping out of a cartridge 202 while the key transport device 220 passes under the cartridges 202. Therefore, the key transport device 220 may travel under cartridges 202 filled with keys to transport a key 204 to either the RFID programming station 222 or the dispensing station 224 without causing other keys 204 to drop, as shown in FIGS. 16 through 18. The key transport device 220 may include an inner curve 248 to slightly lift up the remaining keys 204 in a cartridge 202 as the key transport device 220 moves away from the opening 208. For example, when a key 204 drops into the recess 242, or alternatively, when the key transport device 220 moves under a cartridge 202 opening 208 while containing a key 204, the remaining keys 204 in the cartridge 202 may fall onto the key 204 within the recess 242. The inner curve 248 may push the stack of keys 204 back up off the dropped key 204 in the recess 242 to allow the key transport device 220 to continue moving.

Figure 19:
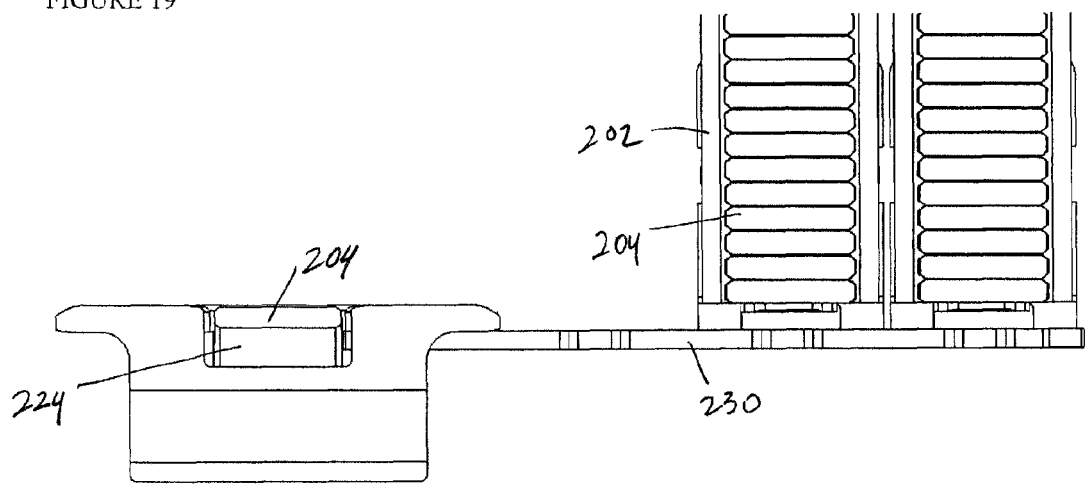
FIG. 19 illustrates the key transport device transporting a key to a dispensing station.
Figure 20:
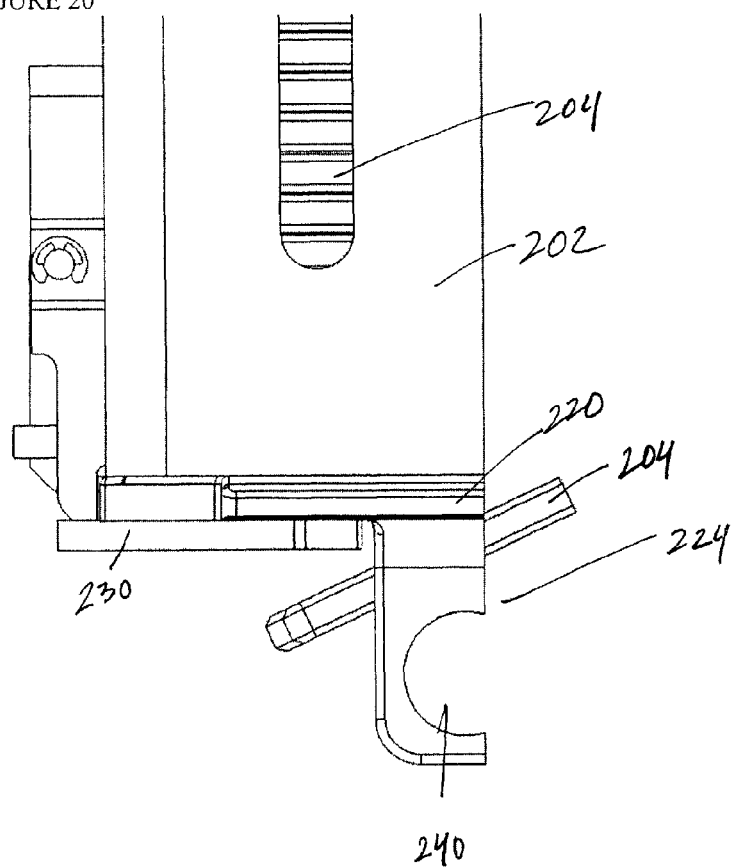
FIG. 20 is a side view of the key transport device in the dispensing station.

FIGS. 19 and 20 illustrate a key 204 in the dispensing station 224 according to one embodiment. Once a key 204 has been properly programmed and tested, the key 204, if working properly, may be brought to the dispensing station 224. In this position, the key floor 230 terminates, allowing the key 204 to fall below into the dispenser output 210 for a user to retrieve. Alternatively, if a defect is detected in the programming and testing attempt, the key 204 may be transported to the rejected key station 226, to fall into a rejected key storage area.

According to some aspects, the key dispenser 200 and/or the cartridges 202 may include sensors 250 to detect when the cartridges 202 are full, empty or low on keys 204 and need to be refilled. The sensors 250 may be located in a bottom portion of the key dispenser 200 to alert when one or more cartridges 202 need refilling. The sensor 250 may be reflective proximity sensors placed under each cartridge 202 to sense when a cartridge 202 is empty or not-empty. Alternatively, the sensors 250 may be pressure sensors and detect the fullness of the cartridges 202. For example, when the sensors detect a predetermined number of keys 204 left in a cartridge 202, the sensors 250 may signal that a refill is required. Alternatively, when two cartridges 202 are determined to be empty, the sensors 250 may alert the need to refill the key dispenser 200. The key dispenser 200 may also include a network interface adapted to receive an output of sensors 250. The network interface may have wired or wireless access to internal and/or external networks including the Internet. The network interface may also be adapted to send data indicating the state of the cartridges 202 over the network or networks. For example, the network interface may send a notification to a service specialist that the cartridges 202 have a state of being empty. The network interface may include or be connected with a central processing unit (CPU), a memory, and any other components that may be known in the art.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A Radio Frequency Identification (RFID) key dispenser for programming an RFID key at the time of dispensing, the key dispenser comprising:
   storage for a plurality of keys to be dispensed; and
   an RFID programming station with network access, wherein the RFID programming station is configured to program a key of the plurality of keys based on information received over the network from a processor system,
   wherein the storage comprises a plurality of cartridges, each configured to store a portion of the plurality of keys,
   wherein each of the plurality of cartridges comprises:
      a housing having an opening; and
      a key retention member movably mounted adjacent the opening, the key retention member being configured to release a key of the plurality of keys when contacted by a key carriage.

2. The RFID key dispenser of claim 1, wherein each of the plurality of cartridges comprises:
   a spring mechanism coupled between the housing and the key retention member biasing at least a portion of the key retention member into the opening.

3. The RFID key dispenser of claim 1, wherein:
   each of the plurality of cartridges comprises a key sensor; and
   the key dispenser further comprises a network interface adapted to receive an output of key sensors of the plurality of cartridges and send over the network data indicating a state of the cartridges.

4. The RFID key dispenser of claim 1, wherein the plurality of cartridges are removable.

5. A Radio Frequency Identification (RFID) key dispenser for programming an RFID key at the time of dispensing, the key dispenser comprising:
   first storage for a plurality of keys to be dispensed;
   an RFID programming station with network access, wherein the RFID programming station is configured to program a key of the plurality of keys based on information received over the network from a processor system;
   a dispensing area;
   second storage for a plurality of defective keys; and
   a key transport mechanism configured to transport a key from the first storage to RFID programming station and from the RFID programming station selectively to the dispensing area or the second storage based on a result of a programming attempt at the RFID programming station, wherein:
   the key transport mechanism comprises a carriage and at least one key surface,
   the carriage comprises an opening therethrough, the opening sized to receive a key, and the carriage mounted to move within a first region, a second region, and a third region,
   the carriage is adjacent the at least one key surface in the first region such that the at least one key surface blocks the opening in the first region, and
   the at least one key surface is configured such that, in the second region and the third region, at least a portion of the opening is unblocked.

6. The RFID key dispenser of claim 5, wherein:
   the at least one key surface comprises:
      a first key surface; and
      a second key surface;
   the carriage is adjacent the first key surface and the second key surface in the first region such that the first key surface blocks a first portion of the opening in the first region and the second key surface blocks a second portion of the opening in the first region; and the first key surface and/or the second key surface is configured such that, in the second region and the third region, at least one of the first portion of the opening or the second portion of the opening is unblocked.

7. The RFID key dispenser of claim 6, wherein:
the first region is adjacent the first storage;
the second region is adjacent the second storage; and
the third region is adjacent the dispensing area.

8. The RFID key dispenser of claim 7, wherein:
the first region, the second region, the third region and the RFID programming station are arranged along a linear path of motion of the carriage; and
the second region and the third region are positioned on opposite sides of the RFID programming station.

9. The RFID key dispenser of claim 8, wherein:
the second region and the third region are positioned on opposite ends of the linear path of motion.

10. A method of operating a Radio Frequency Identification (RFID) key dispenser for programming an RFID key at the time of dispensing, the key dispenser comprising:
a plurality of key retrieval stations for holding a plurality of keys to be dispensed, each key retrieval station having a release mechanism;
an RFID programming station with network access, wherein the RFID programming station is configured to program a key of the plurality of keys based on information received over the network from a processor system;
a key shuttle configured to transport a key from the first storage to RFID programming station and from the RFID programming station,
the method comprising:
moving the key shuttle successively adjacent to each of the plurality of key retrieval stations, the moving comprising, for each of the plurality of key retrieval stations:
the key shuttle engaging the release mechanism of the key retrieval station upon passing adjacent the key retrieval station;
a key moving from a key retrieval station into an opening in the key shuttle when the key shuttle is aligned with the key retrieval station, the release mechanism of the key retrieval station is engaged and the opening in the key shuttle is not blocked by another key; and
the key shuttle disengaging the release mechanism upon moving away from the key retrieval station.

11. The method of claim 10, wherein a single key is mechanically selected from a key retrieval station of the plurality of key retrieval stations based on motion of the key shuttle.

12. The method of claim 10, wherein:
moving the key shuttle successively adjacent to each of the plurality of key retrieval stations comprises moving the key shuttle between predetermined positions, the predetermined positions comprising:
a position adjacent to each of the plurality of key retrieval stations;
a position at a programming station;
a position adjacent to a key dispensing area; and
a position adjacent to a storage area for defective keys.

13. A Radio Frequency Identification (RFID) key dispenser for programming an RFID key at the time of dispensing, the key dispenser comprising:
a cartridge for storing a plurality of keys to be dispensed, the cartridge comprising
a first opening; and
a key retention member movably mounted adjacent the first opening;
a biasing mechanism coupled to the key retention member and biasing at least a portion of the key retention member into the first opening;
a key transport device configured to pick up a key from the cartridge through the first opening, the key transport device movably mounted for movement along a path, the key transport device comprising:
a first surface and a second, opposing surface, the key transport device comprising a second opening between the first surface and the second surface, the second opening being sized to receive a key of the plurality of keys; and
outer walls configured to contact the key retention member as the key transport device passes under the first opening while moving along the path to bias the key retention member out of the first opening when the second opening aligns with the first opening.

14. The Radio Frequency Identification (RFID) key dispenser of claim 13, further comprising:
a support surface adjacent the second surface, the support surface being adjacent to a portion of the second opening over only a portion of the path, the portion being less than all of the path.

* * * * *